(12) United States Patent
Kato

(10) Patent No.: US 7,277,229 B2
(45) Date of Patent: Oct. 2, 2007

(54) LINEAR LIGHT BEAM GENERATING OPTICAL SYSTEM

(75) Inventor: Kiichi Kato, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/438,310

(22) Filed: May 23, 2006

(65) Prior Publication Data

US 2006/0262408 A1    Nov. 23, 2006

(30) Foreign Application Priority Data

May 23, 2005    (JP)    ............................. 2005-149594

(51) Int. Cl.
G02B 27/10 (2006.01)
G02B 27/30 (2006.01)
H01S 5/00 (2006.01)
H01S 3/08 (2006.01)

(52) U.S. Cl. ...................... 359/618; 359/641; 359/625; 372/50.12; 372/75; 372/69; 372/99; 372/101; 372/108; 362/31; 362/615; 385/24; 385/27; 385/31; 385/146; 438/513

(58) Field of Classification Search ................ 359/618, 359/619, 623, 625, 626, 630, 634, 636, 639, 359/641, 831, 834, 894; 372/6, 9, 22, 34, 372/43.01, 50.12, 50.121, 50.23, 69, 70, 372/75, 96, 99, 101, 102, 108, 700; 362/31, 362/555, 558, 615; 348/49, 148, E13.005, 348/E9.027; 385/24, 27, 31, 33, 36, 39, 385/127, 128, 146; 438/513, 530, 689; 353/98, 353/102; 219/121.74, 121.65, 121.73

See application file for complete search history.

(56) References Cited

U.S. PATENT DOCUMENTS

| 4,344,671 | A | * | 8/1982 | Lang .......................... 359/618 |
| 5,212,707 | A | * | 5/1993 | Heidel et al. ............. 372/50.23 |
| 5,668,913 | A | * | 9/1997 | Tai et al. ..................... 385/146 |
| 6,139,156 | A | * | 10/2000 | Okamori et al. .............. 353/98 |
| 6,594,299 | B1 | * | 7/2003 | Hirano et al. ................. 372/75 |
| 6,738,407 | B2 | * | 5/2004 | Hirano et al. ................. 372/69 |

(Continued)

FOREIGN PATENT DOCUMENTS

| JP | 5-21340 A | 1/1993 |
| JP | 10-31820 A | 2/1998 |
| JP | 10-94892 A | 4/1998 |
| JP | 2000-91231 A | 3/2000 |

Primary Examiner—Loha Ben
(74) Attorney, Agent, or Firm—Sughrue Mion, PLLC

(57) ABSTRACT

An optical system includes semiconductor lasers arranged in the direction of the slow axis of the laser beam, an optical means which makes parallel the collimated laser beams, an optical member which is provided with inlet and outlet faces which are positioned in perpendicular to the optical axis of laser beams and total reflection surfaces which are opposed to each other at a space where the component in the direction of the slow axis of the laser beam entering from the light inlet face repeats internal reflection, and emits from the light outlet face a slow axis uniform laser beam, and an imaging optical means which images the slow axis uniform laser beam on a surface as a linear line beam extending in the direction of the slow axis.

6 Claims, 4 Drawing Sheets

U.S. PATENT DOCUMENTS

| | | | |
|---|---|---|---|
| 6,819,861 B2 * | 11/2004 | Ota et al. | 385/146 |
| 6,950,573 B2 * | 9/2005 | Ota et al. | 385/32 |
| 7,129,440 B2 * | 10/2006 | Adams et al. | 219/121.65 |
| 7,135,392 B1 * | 11/2006 | Adams et al. | 438/513 |
| 7,136,408 B2 * | 11/2006 | Spinelli et al. | 372/70 |
| 2006/0221459 A1 * | 10/2006 | Sagan | 359/668 |

* cited by examiner

LINEAR LIGHT BEAM GENERATING OPTICAL SYSTEM

BACKGROUND OF THE INVENTION

1. Field of the Invention

This invention relates to a linear light beam generating optical system for generating a linear light beam which is used in a system for rapidly heating or cooling a large area such as a laser annealing system.

2. Description of the Related Art

There have been known various technologies of linearly projecting a laser beam emitted from a semiconductor laser onto a surface and using the laser beam as a linear light beam. For example, such a linear light beam is used in the field of initialization of an optical disk or laser annealing.

In Japanese Unexamined Patent Publication No. 10(1998)-031820, there is disclosed an optical disk initialization system where a linear light beam projected onto a surface of a medium is used to initialize an optical disk. In the patent publication, there is a disclosure on an optical system which images a light beam emitted from a stripe-like broad area semiconductor laser on a disk as a linear image and various technologies of suppressing unevenness in a light intensity in a longitudinal light intensity distribution are disclosed.

In Japanese Unexamined Patent Publication No. 10(1998)-094892, there is disclosed a laser heating system which is employed, for instance, in a soldering system, and a method in which a laser beam emitted from a semiconductor laser is converged on the side of the slow axis and diverged on the side of the fast axis in order to convert a laser beam emitted from a broad area semiconductor laser into a linear light beam which has a longitudinally uniform intensity distribution is proposed. In the patent publication, a laser beam emitted from a semiconductor laser is projected onto a surface as a linear light beam extending in the direction of the fast axis.

Japanese Unexamined Patent Publication No. 5(1993)-021340 is on a technology of forming single-crystal semiconductor film on an insulating substrate and employs a laser beam as a heat source for zone melting recrystallization. In Japanese Unexamined Patent Publication No. 5(1993)-021340, a method where a beam spot collected on the target is scanned at high speed in a direction perpendicular to the scanning direction, thereby generating a pseudo linear light beam is disclosed as a specific method of realizing a linear light beam.

In an embodiment of Japanese Unexamined Patent Publication No. 2000-091231, there is disclosed a method of obtaining a linear light beam on a surface to be exposed to the light beam by arranging light beams emitted from a semiconductor laser array.

As described above, any of the technologies disclosed in Japanese Unexamined Patent Publication Nos. 10(1998)-031820, 10(1998)-094892, 5(1993)-021340 and 2000-091231 intends to obtain a linear light beam which is uniform in the intensity distribution in the longitudinal direction on a surface to be exposed.

However, since being for linearly shaping a laser beam emitted from a single semiconductor laser, any of the optical systems disclosed in Japanese Unexamined Patent Publication Nos. 10(1998)-031820, 10(1998)-094892, and 5(1993)-021340 has drawbacks that it cannot obtain a projecting light having a sufficient power and projection onto a large area is difficult especially at wavelengths, other than 810 nm and 980 nm, where it is difficult to obtain a high output power semiconductor laser.

Further, in accordance with the optical system disclosed in Japanese Unexamined Patent Publication No. 2000-091231, though a linear light beam covering a large area can be obtained by arranging a plurality of semiconductor lasers, the light beam cannot be sufficiently stopped in the direction of the fast axis since the intensity of the light beam is uniformed by the use of a homogenizer without taking into account the slow axis or the fast axis of the laser beam.

SUMMARY OF THE INVENTION

In view of the foregoing observations and description, the primary object of the present invention is to provide a linear light beam generating optical system which can generate a linear light beam which has sufficient power uniform in the longitudinal direction.

The linear light beam generating optical system of the present invention comprises a plurality of semiconductor lasers arranged in the direction of the slow axis of the laser beam emitted from each semiconductor laser, an optical means which collimates at least a component in the direction of the fast axis of each of the laser beam emitted from a plurality of the semiconductor lasers and makes at least two of the collimated laser beams parallel to each other, an optical member which is provided with a light inlet face and a light outlet face which are positioned in substantially perpendicular to the optical axis of each laser beams and a pair of total internal reflection surfaces which are opposed to each other at a space where the component in the direction of the slow axis of the laser beam entering from the light inlet face repeats total internal reflection, and emits from the light outlet face a slow axis uniform laser beam which is uniformed only in the intensity distribution of the component in the direction of the slow axis, an inlet optical means which causes the laser beams emitted from a plurality of the semiconductor lasers to enter the light inlet face of the optical member, and an imaging optical means which images the slow axis uniform laser beam on a predetermined surface to be exposed like a linear line beam extending in the direction of the slow axis.

It is preferred that a transparent plane parallel plate or a transparent plane tapered plate where the space between the total internal reflection surfaces gradually increases toward the light outlet face from the light inlet face thereof be employed as the optical member.

It is preferred that a broad area semiconductor laser be used as the semiconductor laser.

Since the linear light beam generating optical system of the present invention comprises an optical means which collimates at least a component in the direction of the fast axis of each of the laser beams emitted from a plurality of the semiconductor lasers and makes at least two of the collimated laser beams parallel to each other, and an optical member which is provided with a light inlet face and a light outlet face which are positioned in substantially perpendicular to the optical axis of each laser beams and a pair of total internal reflection surfaces which are opposed to each other at a space where the component in the direction of the slow axis of the laser beam entering from the light inlet face repeats total internal reflection, and emits from the light outlet face a slow axis uniform laser beam which is uniformed only in the intensity distribution of the component in the direction of the slow axis, a linear light beam which keeps its coherency in the direction of the fast axis and is uniformed in the intensity distribution in the direction of the slow axis can be generated on the surface to be exposed. Depending on the structure of the optical means which collimates a component in the direction of the fast axis, the slow axis uniform laser beam may be imaged on the predetermined surface to be exposed as a single linear line beam or two or more linear line beams which are converged in a predetermined position in the direction of the fast axis.

Since at least two laser beams are superimposed one on another. a high power linear light beam can be obtained.

Especially, when a broad area semiconductor laser, which is of a high power, is used, a higher power linear light beam can be obtained and at the same time, since the laser beam emitted from a broad area semiconductor laser is of a multi-mode in the direction of the slow axis, the light intensity can be more uniformed.

When a transparent plane parallel plate or a transparent plane tapered plate is employed as the optical member, the optical system may be low in cost and simple in structure. Especially, when a transparent plane tapered plate where the space between the total reflection surfaces gradually increases toward the light outlet face from the light inlet face thereof is employed as the optical member, the beam can be large in width at the light outlet face, which is suitable for obtaining a wide linear light beam.

DESCRIPTION OF THE PREFERRED EMBODIMENTS

Figure 1A:
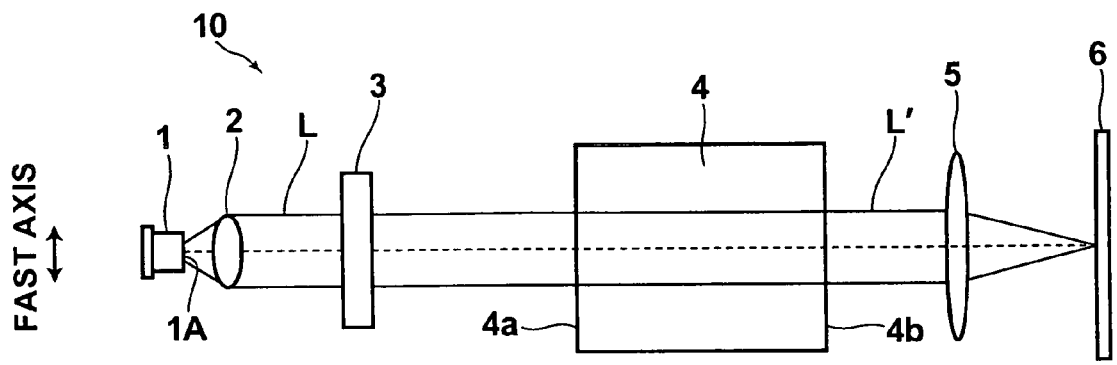
FIGS. 1A to 1C are views briefly showing the structure of a linear light beam generating optical system in accordance with a first embodiment of the present invention, FIG. 2 are views showing an intensity distribution of a laser beam in the light outlet end face of a semiconductor laser.
Figure 1B:
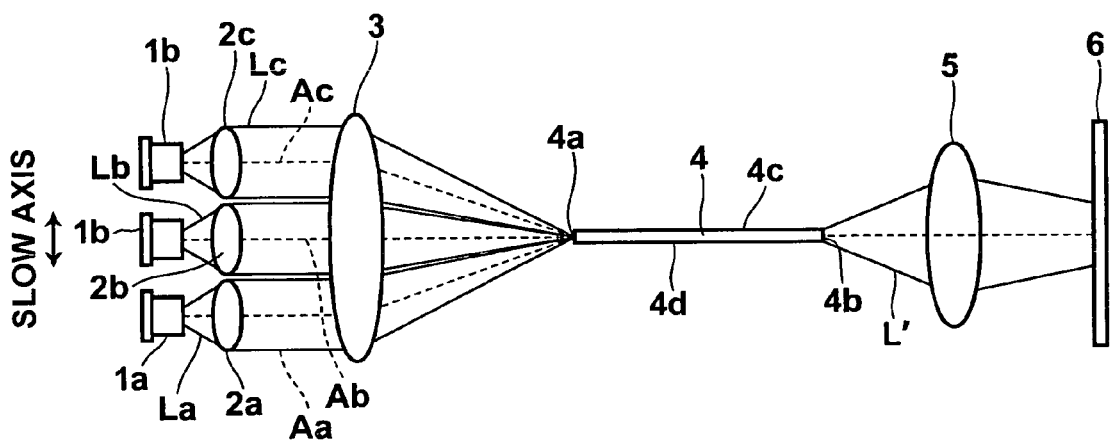
Figure 1C:
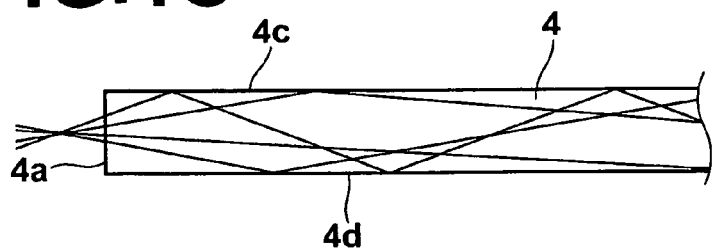

FIG. 1A is a plan view of a linear light beam generating optical system in accordance with a first embodiment of the present invention as seen from the slow axis, FIG. 1B is a plan view of the linear light beam generating optical system as seen from the fast axis and FIG. 1C is an enlarged view of a part of the plane parallel plate.

The linear light beam generating optical system 10 of the first embodiment of the present invention comprises a plurality of semiconductor lasers 1 (three in this particular embodiment, and are respectively denoted by 1a, 1b and 1c), a plurality of collimator lenses 2 (three in this particular embodiment, and are respectively denoted by 2a, 2b and 2c) which respectively collimate laser beams L (La, Lb and Lc) emitted from the semiconductor lasers 1a, 1b and 1c, a plane parallel plate 4 which acts as a homogenizer in the direction of the slow axis, a lens 3 which has refractive power only in the direction of the slow axis, and collects the laser beams in the direction of the slow axis to cause them to enter the plane parallel plate 4 from its light inlet face 4a and an imaging lens 5 which images the light emanating from a light outlet face 4b of the plane parallel plate 4 on a predetermined surface 6 to be exposed.

In the following description, the semiconductor lasers are attached with a, b and c only when necessary, and are not attached with a, b and c when unnecessary. This is the same as the collimator lenses 2 and laser beams L.

Figure 2:
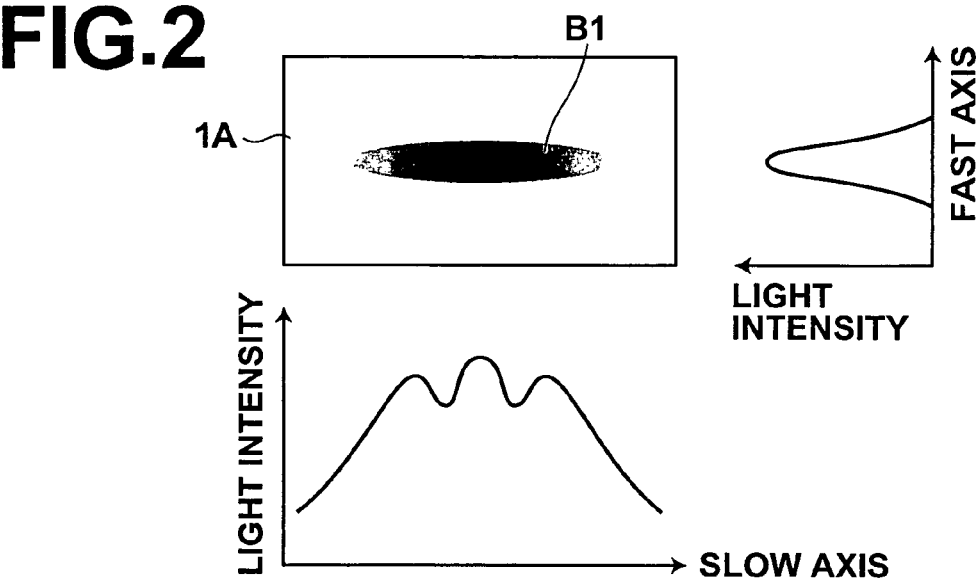

FIG. 2 shows an intensity distribution of the laser beam L in the light outlet end face 1A of the semiconductor laser 1. The semiconductor laser 1 is a broad area semiconductor laser and emits a laser beam which is substantially of a single mode in the direction of the fast axis but of a multi-mode in the direction of the slow axis perpendicular to the direction of the fast axis. The fast axis of a laser beam is an axis perpendicular to a laminated face of the active layer of the semiconductor laser, and the slow axis of the laser beam is an axis parallel to the laminated face and at the same time perpendicular to the fast axis.

The collimator lens 2 collimates the laser beam from the semiconductor laser 1. Though the collimator lens 2 collimates the laser beam from the semiconductor laser 1 in both the directions of the fast and slow axes, here, the collimator lens 2 has only to collimate the laser beam at least in the direction of the fast axis. The collimator lenses 2a, 2b and 2c collimates the laser beams La, Lb and Lc from the semiconductor lasers 1a, 1b and 1c so that the optical axes Aa, Ab and Ac thereof are parallel to each other.

The lens 3 forms the inlet optical means and collects the laser beam L emitted from the semiconductor laser 1 in the direction of the slow axis to cause them to enter the plane parallel plate 4. The lens 3 does not act in the direction of the fast axis.

Figure 3A:
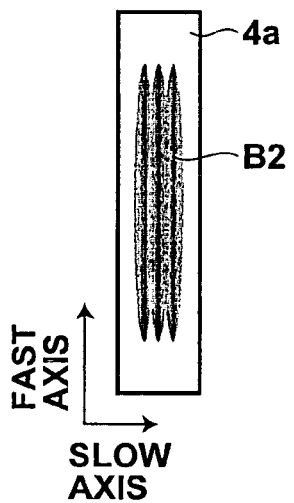
FIG. 3A is a view showing an image of a laser beam in a light inlet face of a plane parallel plate.
Figure 3B:
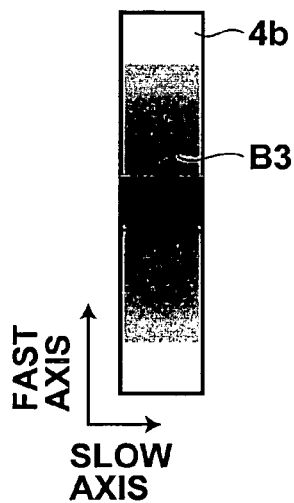
FIG. 3B is a view showing an image of a laser beam in a light outlet face of a plane parallel plate.

The plane parallel plate 4 is an optical part having a pair of total internal reflection surfaces 4c and 4d which are opposed to each other at a space where the component in the direction of the slow axis of the laser beam L entering from the light inlet end face 4a repeats total internal reflection, and emitting from its light outlet end face 4b a slow axis uniform laser beam which is uniformed only in the intensity distribution of the component in the direction of the slow axis and is a homogenizer in the direction of the slow axis. As shown in FIG. 1C, the laser beam L entering the plane parallel plate 4 travels toward the light outlet end face 4b while repeating total internal reflection between the total internal reflection surfaces 4c and 4d and the intensity distribution of the laser beam L in the direction of the slow axis is thereby uniformed. Further, the plane parallel plate is long enough in the direction of the fast axis not to act on the laser beam in the direction of the fast axis. FIG. 3A shows an image B2 of a laser beam in the light inlet end face 4a of a plane parallel plate 4, and FIG. 3B shows an image B3 of a laser beam in the light outlet face 4b of a plane parallel plate 4. In the light inlet end face 4a, three laser beams enter arranged in the direction of the slow axis and form an image B2 which is non-uniform in the intensity distribution in the direction of the slow axis. Whereas, in the light outlet end face 4b, an image B3 which is uniform in the intensity distribution in the direction of the slow axis is formed.

The imaging lens 5 projects the image B3 of the linear light beam in the light outlet end face 4b onto the surface to be exposed in the direction of the slow axis. The imaging lens 5 may project the image B3 in a suitably enlarged or reduced size. The imaging lens 5 is positioned to collect light on the surface to be exposed in the direction of the fast axis of the light beam. At this time, the surface to be exposed is positioned in a position conjugate with the light emitting face of the semiconductor laser.

In the linear light beam generating optical system 10, a plurality of the laser beams L emitted from a plurality of the semiconductor lasers 1 are collimated by the respective collimator lenses 2 so that their optical axes A are parallel to each other and are collected in the direction of the slow axis to enter the plane parallel plate 4 from the light inlet face 4a by the lens 3. In the plane parallel plate 4, the laser beams repeat total internal reflection between the total internal reflection surfaces 4c and 4d perpendicular to the direction of the slow axis, and emitted from the light outlet face 4b. That is, in the plane parallel plate 4, the laser beams travels straight in the direction of the fast axis keeping its wavefront without affected in the direction of the fast axis and at same time, repeat total internal reflection in the direction of the slow axis, and reach the light outlet face 4b. By this, a light beam L' where the intensity distribution of the laser beam in the direction of the slow axis is uniformed can be obtained.

Figure 4:
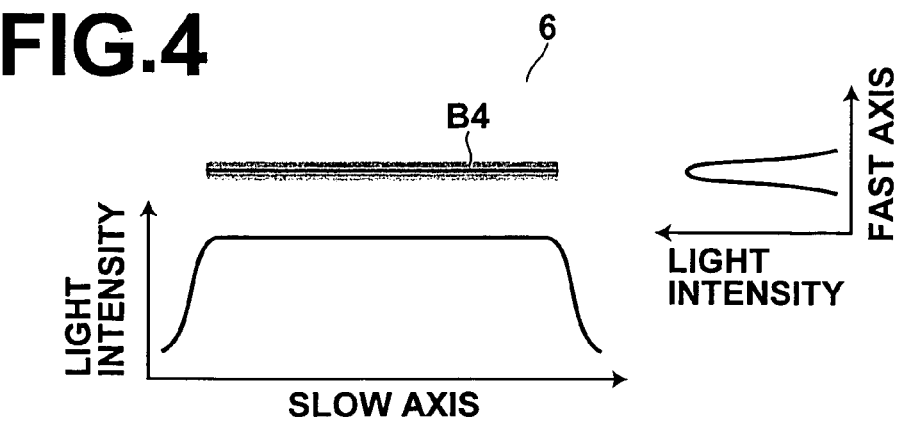
FIG. 4 is a view showing intensity distributions of a linear light beam in the direction of the fast axis and in the direction of the slow axis.

The slow axis uniform laser beam L' which is emitted from the light outlet face 4b of the plane parallel plate 4 is imaged on a surface 6 to be exposed by the imaging lens 5. FIG. 4 show intensity distributions in the direction of the fast axis and in the direction of the slow axis of a linear light beam B4 generated on the surface 6 to be exposed. As shown in FIG. 4, a linear light beam B4 which comprises, in the direction of the fast axis, a plurality of laser beams superimposed one on another and stopped substantially up to the diffraction limited, and, in the direction of the slow axis, a plurality of laser beams from the respective semiconductor lasers which are mingled together to be uniform in the brightness distribution.

Though three semiconductor lasers are provided in this embodiment, a linear light beam of a higher power can be obtained by increasing the number of the semiconductor lasers to superimpose one on another laser beams from the number of semiconductor lasers.

By moving the linear light beam generated by the linear light beam generating optical system 10 in accordance with this embodiment at a suitable speed in the direction of the fast axis relatively to a sample placed on the surface to be exposed, the sample can be rapidly heated or rapidly cooled. In the linear light beam generating system 10 of this embodiment, the linear light beam may be enlarged to a desired enlarged image by the imaging lens 5, and it is possible to use the enlarged image in rapid heating of a desired large area by scanning it. For example, it may be used in annealing of Si film. Further, initialization of an optical disk of phase change can be effected at high speed. Further, it is effective when a thermooptic effect is to be obtained at a particular wavelength on a large area.

Though, in the linear light beam generating system 10 of this embodiment, the laser beams are made parallel to each other and passed through the homogenizer (plane parallel plate 4) in the direction of the fast axis, an optical means which converges or diverges the laser beams may be disposed on the way. For example, a lens having refractive power to refract the laser beams in the direction of the fast axis may be disposed between the homogenizer and the collimator lenses to collect laser beams by the light outlet face of the homogenizer (the light outlet face 4a of the plane parallel plate 4).

Figure 5:
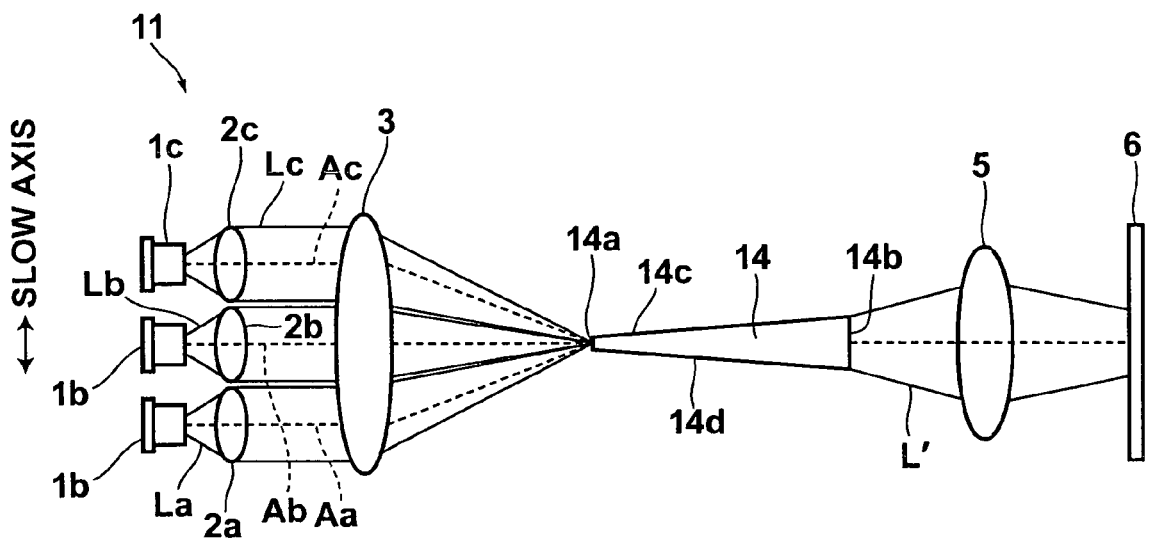
FIG. 5 is a view briefly showing the structure of a linear light beam generating optical system in accordance with a second embodiment of the present invention.
Figure 6:
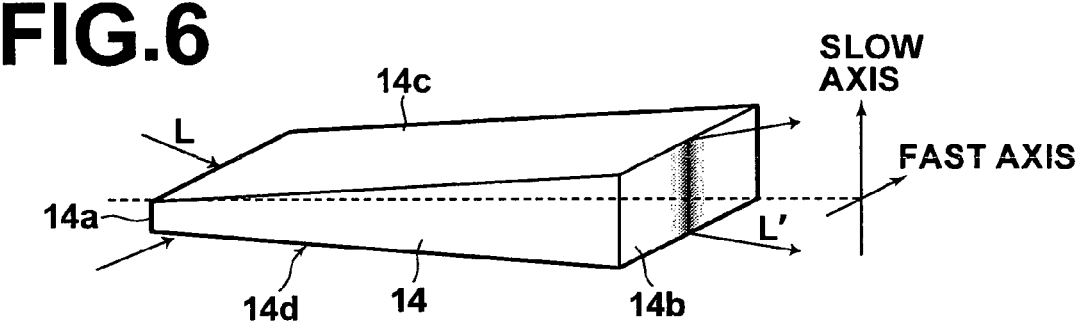
FIG. 6 is a perspective view of a plane tapered plate.

FIG. 5 is a view which briefly shows the structure of a linear light beam generating optical system 11 in accordance with a second embodiment of the present invention and is a plan view thereof as seen from the fast axis. Elements analogous to those of the first embodiment are given the same reference numerals and will not be described in detail here. (The same in the following embodiments) The linear light beam generating optical system 11 of this embodiment differs from that of the first embodiment in that a plane tapered plate 14 is employed instead of a plane parallel plate 4 as a homogenizer for the components in the direction of the slow axis. FIG. 6 is a perspective view of the plane tapered plate 14.

In the plane tapered plate 14, the space between total internal reflection surfaces 14c and 14d gradually increases toward a light outlet face 14b from a light inlet face 14a thereof. Also in the case where the plane tapered plate 14 is employed, the laser beam L entering from the light inlet end face 14a repeats total internal reflection, and a slow axis uniform laser beam which is uniformed in the intensity distribution in the direction of the slow axis is emitted from the light outlet end face 14b. This embodiment is suitable for obtaining a broad light beam since the light beam is widened in its width and is reduced in its numerical aperture with the laser beam L travels toward the light outlet face 14b from the light inlet face 14a.

Though the light bundles from the lasers are converged on one point in the direction of the fast axis on the surface to be exposed in each of the linear light beam generating systems of the embodiments described above, it is possible depending upon the setting of optical systems to separate the beam to have a plurality of peaks or to cause the beam to have an arbitrary intensity distribution.

Figure 7A:
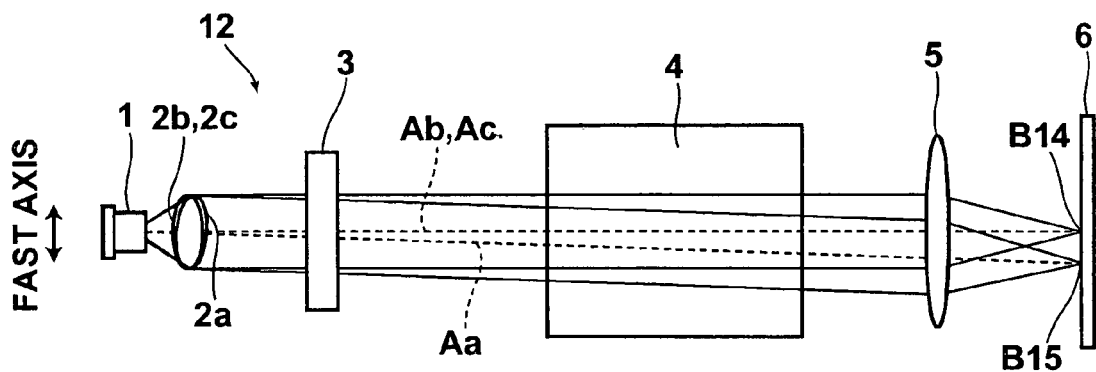
FIG. 7A is a view briefly showing the structure of a linear light beam generating optical system in accordance with a third embodiment of the present invention.
Figure 7B:
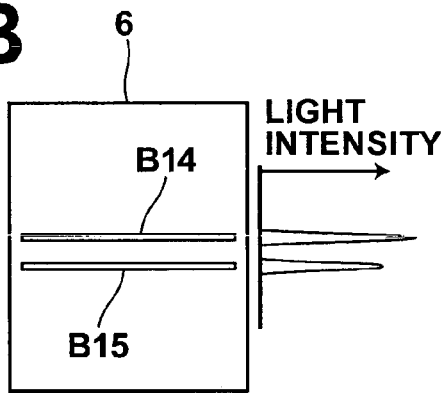
FIG. 7B is a view showing an image of a linear light beam generated on a surface to be exposed.

FIG. 7A is a view which briefly shows the structure of a linear light beam generating optical system 12 in accordance with a third embodiment of the present invention and is a plan view thereof as seen from the slow axis. The linear light beam generating optical system 12 of this embodiment differs from that of the first embodiment in that one collimator lens 2a of a plurality of the collimator lenses 2 is inclined with respect to the fast axis. By this, the optical axis Aa of one laser beam La can be shifted from the optical axes Ab and Ac of the other laser beams Lb and Lc and the converging position in the direction of the fast axis on the surface 6 to be exposed to simultaneously generate two linear light beams B14 and B15 different from each other in intensity ratio on the surface 6 to be exposed as shown in FIG. 7B. Depending upon the number of semiconductor lasers or setup of the optical systems, the optical systems may be arranged to generate more than two linear light beams. A system where a plurality of linear light beams gradually reduced in the intensity in the direction of the fast axis are generated may be employed when the sample is to be stepwise cooled after rapid heating.

Figure 8:
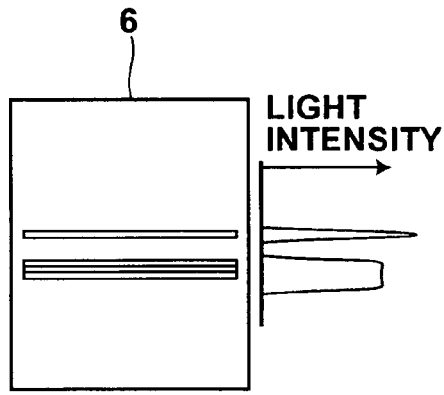
FIG. 8 is a view showing another example of an image of a linear light beam generated on a surface to be exposed.

Further, depending upon setting of the optical systems, the linear light beams may have any intensity distribution. For example, by shifting converging positions of a plurality of linear light beams so that the intensity distributions in the direction of the fast axis are partly overlap each other as shown in FIG. 8, broad light beams can also be obtained, and a plurality of linear light beams different in width may be simultaneously generated.

Though broad area semiconductor lasers are employed as the semiconductor lasers in the above embodiments, the present invention may be applied to the linear light beam generating systems employing other semiconductor lasers.

What is claimed is:

1. A linear light beam generating optical system comprising
    a plurality of semiconductor lasers arranged in the direction of the slow axis of the laser beam emitted from each semiconductor laser,
    an optical means which collimates at least a component in the direction of the fast axis of each of the laser beams emitted from the plurality of the semiconductor lasers and makes at least two of the collimated laser beams parallel to each other,
    an optical member which is provided with a light inlet face and a light outlet face which are positioned in substantially perpendicular to the optical axis of each laser beam and a pair of total internal reflection surfaces which are opposed to each other at a space where the component in the direction of the slow axis of the laser beam entering from the light inlet face repeats total internal reflection, and emits from the light outlet face a slow axis uniform laser beam which is uniformed only in the intensity distribution of the component in the direction of the slow axis,
    an inlet optical means which causes the laser beams emitted from the plurality of the semiconductor lasers to enter the light inlet face of the optical member, and
    an imaging optical means which images the slow axis uniform laser beam on a predetermined surface to be exposed like a linear line beam extending in the direction of the slow axis.

2. A linear light beam generating optical system as defined in claim 1 in which the semiconductor lasers are broad area semiconductor lasers.

3. A linear light beam generating optical system as defined in claim 1 in which the optical member is a transparent plane parallel plate.

4. A linear light beam generating optical system as defined in claim 3 in which the semiconductor lasers are broad area semiconductor lasers.

5. A linear light beam generating optical system as defined in claim 1 in which the optical member is a transparent plane tapered plate where the space between the total internal reflection surfaces gradually increases toward the light outlet face from the light inlet face.

6. A linear light beam generating optical system as defined in claim 5 in which the semiconductor lasers are broad area semiconductor lasers.

* * * * *